United States Patent [19]

Gardaz et al.

[11] Patent Number: 4,677,000

[45] Date of Patent: Jun. 30, 1987

[54] METHOD FOR FORMING A DECORATION ON A COATING OF POLYTETRAFLUOROETHYLENE (PTFE)

[75] Inventors: Claudine Gardaz; Jean-Pierre Buffard, both of Rumilly, France

[73] Assignee: SEB S.A., Selongey, France

[21] Appl. No.: 817,572

[22] Filed: Jan. 10, 1986

[30] Foreign Application Priority Data

Jan. 23, 1985 [FR] France ................. 85 00896

[51] Int. Cl.$^4$ ................. B05D 3/02; B05D 5/08
[52] U.S. Cl. ................. 427/261; 427/282; 427/287
[58] Field of Search ................. 427/261, 282, 287; 428/187, 422

[56] References Cited

U.S. PATENT DOCUMENTS

| | | | |
|---|---|---|---|
| 4,064,303 | 12/1977 | Vassiliou | 427/145 X |
| 4,118,537 | 10/1978 | Vary et al. | 427/216 X |
| 4,259,375 | 3/1981 | Vassiliou | 427/282 |

FOREIGN PATENT DOCUMENTS

| | | |
|---|---|---|
| 0022257 | 1/1981 | European Pat. Off. |
| 2296010 | 4/1976 | France . |

*Primary Examiner*—Evan K. Lawrence
*Attorney, Agent, or Firm*—Young & Thompson

[57] ABSTRACT

A method for forming a decoration on a coating of polytetrafluoroethylene (PTFE) applied on a metallic substrate as applicable in particular to internal and/or external decoration of culinary utensils, and comprising the following steps:

forming an anti-adhesive layer of a composition based on an aqueous dispersion of PTFE, which may or may not be colored, on the metallic substrate, after drying and prior to sintering of the anti-adhesive layer, applying on this layer through a serigraphic screen a colored composition containing an aqueous dispersion or a powder of fluorocarbon resin to which are added a thickening and/or gelling agent and a solvent which is miscible with water and has a vapor pressure below that of water after drying, baking the two layers thus obtained simultaneously in order to sinter all the particles of PTFE and of fluorocarbon resin.

11 Claims, No Drawings

METHOD FOR FORMING A DECORATION ON A COATING OF POLYTETRAFLUOROETHYLENE (PTFE)

BACKGROUND OF THE INVENTION

1. Field of the Invention

The present invention relates to a method for forming a decoration on a coating of polytetrafluoroethylene (PTFE) applied on a metallic substrate.

2. Description of the Prior Art

It is well known that nothing adheres to a coating of PTFE. It is therefore impossible to apply a decorative pattern which adheres sufficiently strongly to said coating.

Especially in the case of culinary utensils coated with PTFE, it is particularly advantageous to improve the outward appearance of these latter by applying on the PTFE coating, either on the inside or on the outside of the utensil, a colored decoration which adheres perfectly to said coating and affords high resistance to wear.

Culinary utensils are usually obtained by die-stamping a metal disk and especially a disk of aluminum which has previously been coated with PTFE. During this die-stamping operation, the coating of PTFE is subjected to large stretching forces which tend to tear-off said coating.

SUMMARY OF THE INVENTION

The aim of the present invention is to propose a method for forming a decoration on a coating of PTFE which is applied on a metallic substrate and affords a sufficient degree of adhesion to be capable of withstanding the stretching forces aforesaid.

In accordance with the invention, said method is distinguished by the following steps:

forming a layer of a composition of anti-adhesive coating product based on a dispersion of PTFE, which may or may not be colored, on the metallic substrate, after drying and prior to sintering of said layer, applying on this layer through a serigraphic screen a colored composition containing an aqueous dispersion of fluorocarbon resin or a powder of fluorocarbon resin to which are added a thickening and/or gelling agent and a solvent which is miscible with water and has a vapor pressure below that of water after drying, baking the two layers thus obtained simultaneously in order to sinter together all the particles of PTFE and of fluorocarbon resin.

The present applicant has found that a simple aqueous dispersion of fluorocarbon resin could not be employed for the purpose of forming a decoration by serigraphic screen-process deposition.

In fact, the fluorocarbon resin particles exhibit very low resistance to the shearing stresses produced by squeezing of these particles through the very fine meshes of the stencil screen. Moreover, these particles have a tendency to agglomerate and to clog the meshes of the serigraphic screen.

The present applicant has found, surprisingly, that this drawback could be overcome by adding a gelling and/or thickening agent to the fluorocarbon resin in powdered form in order to convert this composition to a paste or gel in which the fluorocarbon resin particles are separated from each other, thus preventing them from collecting into a mass.

Furthermore, it is preferable to add to said paste or gel a solvent such as a glycol having a vapor pressure which is lower than that of water in order to prevent excessively rapid drying of said composition on and between the meshes of the serigraphic screen.

In addition, the simultaneous baking of the two layers, namely the first layer of PTFE and the decorative layer based on fluorocarbon resin makes it possible to obtain sintering of the particles of the first layer with those of the second layer and thus to obtain excellent adhesion of this latter.

In an advantageous embodiment of the invention, the composition containing the fluorocarbon resin is supplied with an addition consisting of a thickening and/or gelling agent which provides this composition with a viscosity within the range of 10,000 to 120,000 centipoises measure at 20° C.

This range of viscosity makes it possible to obtain the best results, namely a uniform distribution of the fluorocarbon resin particles and an excellent definition of the decorative pattern without any burrs on the first layer of PTFE.

In a preferred embodiment of the invention, the fluorocarbon resin is PTFE.

However, this resin can be replaced by tetrafluoroalcoxy resin (TFA) or fluorinated ethylene propylene resin (FEP) or a mixture of these fluorocarbon resins in all proportions.

A base is preferably added to the composition containing the fluorocarbon resin in order to ensure that the pH value of this composition is higher than 9. This base catalyzes the formation of a gel.

Preferably, the thickening and/or gelling agent is a chemical compound which sublimates at a temperature below or equal to the sintering temperature of the particles of PTFE and of fluorocarbon resin.

In consequence, after sintering, there remains in the decorative pattern no trace of said thickening and/or gelling agent which would be liable to affect the food protection properties of the coating as well as its appearance and its anti-adhesive performances.

The best results are obtained when the thickening and/or gelling agent is a copolymer of acrylic acid and/or methacrylic acid.

However, excellent results can also be obtained by employing a thickening and/or gelling agent selected from the bentones, polysaccharides, alginates, carboxymethylcellulose or guaranates.

A few examples of practical application of the method in accordance with the invention are given hereinafter.

EXAMPLE 1

A composition of anti-adhesive coating product based on an aqueous dispersion of PTFE particles was applied so as to form the first layer on an aluminum disk which had previously been deoxidized and subjected to chemical attack in order to form cavities in the disk surface. This first layer was then dried between 30° and 80° C. in order to produce evaporation of the water and solvents from the anti-adhesive coating composition.

The following composition was prepared at the same time for subsequent use as a decorative pattern:

Aqueous dispersion of PTFE: 100 to 800 parts by weight

Propylene glycol: 20 to 400 parts by weight

Acrylic copolymer in the form of an aqueous dispersion supplied with an addition of ammonium hydroxide: 30 to 600 parts by weight Colored pigment in the form of an aqueous dispersion: 50 to 400 parts by weight.

By way of example, the aqueous dispersion of PTFE can be the product which is marketed by Hoechst under the reference TF 5135 or by I.C.I. under the reference 675 AD and contains PTFE particles within the size range of 0.2 to 0.5μ. The aqueous dispersion of acrylic copolymer can be the product which is known by the trade name "Rohagit SD 15" and contains 8% dry extract, or "Viscalex VG 2" and "Viscalex VG 3".

The above-mentioned composition was prepared by mixing and adding in the same order the aqueous dispersion containing the pigment, then the dispersion of PTFE and finally the acrylic copolymer in the form of a gel containing for example 250 g of "Rohagit SD 15", 655 g of water and 75 g of ammonium hydroxide.

The viscosity of the mixture thus obtained and measured by means of a Brookfield viscosimeter was equal to 93,000 centipoises at 20° C.

After homogenization, the mixture was applied on the first layer of PTFE by means of a doctor blade through a serigraphic screen of stainless steel having a mesh size within the range of 70 to 200μ and comprising the decorative pattern to be reproduced.

This serigraphic deposited layer was then dried at 50°-70° C.

The two layers were sintered together at 400° C. for a period of six minutes.

A decorative layer was then obtained, had a thickness within the range of 2 to 25μ, and adhered perfectly to the subjacent layer of PTFE.

The disk thus coated and decorated can be die-stamped in the form of a saucepan, cooking pan, frying-pan or the like. This operation subjects the first layer of PTFE and the second decorative layer to very high stretching forces which do not affect the adhesion of these two layers.

EXAMPLE 2

The same procedure as in Example 1 was adopted and the following composition was employed in order to form the second decorative layer:

Aqueous dispersion of TFA (tetrafluoroalcoxy resin): 50 to 400 g

Propylene glycol: 20 to 100 g

Acrylic copolymer in the form of an aqueous dispersion supplied with an addition of ammonium hydroxide: 5 to 400 g Pigment in the form of an aqueous dispersion: 5 to 100 g The aqueous dispersion of TFA can be the product marketed by the Hoechst Company under the trade name "TFA 6900 (50% dry extract)".

As in Example 1, the acrylic copolymer can be "Rohagit SD 15" containing 8% dry extract. This composition has a viscosity of 31,000 centipoises.

EXAMPLE 3

The same procedure as in the foregoing examples was again adopted by making use of the following composition:

PTFE in powdered form: 5 to 50 g

Propylene glycol: 5 to 100 g

Acrylic copolymer in the form of an aqueous dispersion supplied with an addition of ammonium hydroxide: 5 to 50 g Pigment in the form of an aqueous dispersion: 1 to 100 g The PTFE in the form of powder can be the product sold by the Hoechst Company under the reference "9202".

What is claimed is:

1. A method for forming a decoration on a coating of polytetrafluoroethylene (PTFE) applied on a metallic substrate, wherein said method comprises the following steps:
    forming a layer of anti-adhesive coating product based on an aqueous dispersion of PTFE on the metallic substrate,
    drying said layer and prior to sintering said layer,
    applying on said layer through a serigraphic screen a colored composition containing an aqueous dispersion of fluorocarbon resin or a powder of fluorocarbon resin, a solvent which is miscible with water and has a vapor pressure below that of water after drying, and a thickening and/or gelling agent in a quantity sufficient to convert the composition to a paste or gel in which the resin particles are separated from each other, and
    thereafter baking simultaneously the two layers thus obtained in order to sinter all the particles of PTFE and of fluorocarbon resin.

2. A method according to claim 1, wherein the thickening and/or gelling agent is present in an amount such as to provide said composition with a viscosity within the range of 10,000 to 120,000 centipoises.

3. A method according to claim 1, wherein the fluorocarbon resin is selected from the group consisting of polytetrafluoroethylene (PTFE), tetrafluoroalcoxy (TFA) resin and fluorinated ethylene propylene (FEP) resin or a mixture of these resins.

4. A method according to claim 1, wherein the composition containing the fluorocarbon resin is supplied with an addition consisting of a base so as to ensure that the pH value of this composition is higher than 9.

5. A method according to claim 1, wherein the thickening and/or gelling agent is a chemical compound which sublimates at a temperature below or equal to the sintering temperature of the particles of PTFE and of fluorocarbon resin.

6. A method according to claim 1, wherein the thickening and/or gelling agent is a copolymer of acrylic acid and/or methacrylic acid.

7. A method according to claim 1, wherein the thickening and/or gelling agent is selected from the group consisting of bentones, polysaccharides, alginates, carboxymethylcellulose, and guaranates.

8. A method according to claim 1, wherein the solvent is a glycol.

9. A method according to claim 1, wherein the composition applied on the layer of PTFE contains the following compounds:
    Aqueous dispersion of PTFE (60% dry extract): 100 to 800 parts by weight
    Propylene glycol: 20 to 400 parts by weight
    Acrylic copolymer in the form of an aqueous dispersion supplied with an addition of ammonium hydroxide: 30 to 600 parts by weight
    Pigment in the form of an aqueous dispersion: 50 to 400 parts by weight.

10. A method according to claim 1, wherein the composition applied on the layer of PTFE contains the following compounds:
  Aqueous dispersion of TFA (50% dry extract): 50 to 400 g
  Propylene glycol: 20 to 100 g
  Acrylic copolymer in the form of an aqueous dispersion supplied with an addition of ammonium hydroxide: 5 to 400 g
  Pigment in the form of an aqueous dispersion: 5 to 100 g.

11. A method according to claim 1, wherein the composition applied on the PTFE layer contains the following compounds:
  PTFE in powdered form: 5 to 50 g
  Propylene glycol: 5 to 100 g
  Acrylic copolymer in the form of an aqueous dispersion supplied with an addition of ammonium hydroxide: 5 to 50 g
  Pigment in the form of an aqueous dispersion: 1 to 100 g.

* * * * *